United States Patent
Hirabayashi et al.

(10) Patent No.: US 10,264,456 B2
(45) Date of Patent: *Apr. 16, 2019

(54) MOBILE TERMINAL AND CONTROL METHOD THEREOF

(71) Applicant: MAXELL, LTD., Kyoto (JP)

(72) Inventors: Masayuki Hirabayashi, Yokohama (JP); Hideo Nishijima, Hitachinaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,222

(22) Filed: Oct. 25, 2018

(65) Prior Publication Data

US 2019/0069174 A1    Feb. 28, 2019

Related U.S. Application Data

(63) Continuation of application No. 13/874,535, filed on May 1, 2013.

(30) Foreign Application Priority Data

May 23, 2012 (JP) .................. 2012-117105

(51) Int. Cl.
*H04W 12/06* (2009.01)
*H04L 29/06* (2006.01)

(52) U.S. Cl.
CPC ......... *H04W 12/06* (2013.01); *H04L 63/0492* (2013.01)

(58) Field of Classification Search
CPC .. H04M 1/66; H04B 7/00; H04L 9/32; H04W 12/06; H04W 12/00
See application file for complete search history.

(56) References Cited

U.S. PATENT DOCUMENTS

| 2004/0046638 | A1 | 3/2004 | Kawasaki |
| 2006/0123242 | A1* | 6/2006 | Merrem .............. E05B 73/0082 713/186 |
| 2006/0128305 | A1 | 6/2006 | Delalat |
| 2006/0224882 | A1 | 10/2006 | Chin |

(Continued)

FOREIGN PATENT DOCUMENTS

| JP | 2002-183866 A | 6/2002 |
| JP | 2004-102682 A | 4/2004 |

(Continued)

OTHER PUBLICATIONS

Office Action dated Mar. 3, 2015, which issued during the prosecution of Japanese Patent Application No. 2012-117105, which corresponds to the present application.

(Continued)

*Primary Examiner* — Dong-Chang Shiue

(74) *Attorney, Agent, or Firm* — Baker Botts L.L.P.

(57) ABSTRACT

There is provided a mobile terminal capable of being protected against unauthorized use by a third party without using a dedicated key device. A plurality of mobile terminals are previously registered mutually. When unlocked among them, one mobile terminal communicates with another mobile terminal in a communication range of short-range wireless communications, unlocks the above another mobile terminal, and when out of the communication range, locks it again.

20 Claims, 10 Drawing Sheets

(56) References Cited

U.S. PATENT DOCUMENTS

| | | |
|---|---|---|
| 2007/0287423 A1 | 12/2007 | Kakiuchi et al. |
| 2010/0144275 A1 | 6/2010 | Satou |
| 2011/0086615 A1 | 4/2011 | Golder |
| 2011/0195665 A1 | 8/2011 | Friedlaender |
| 2012/0040611 A1* | 2/2012 | Griffin .............. H04W 52/0254 |
| | | 455/41.1 |
| 2012/0280790 A1* | 11/2012 | Gerhardt ............ G07C 9/00309 |
| | | 340/5.61 |
| 2013/0183936 A1* | 7/2013 | Smtih ................... H04W 12/06 |
| | | 455/411 |

FOREIGN PATENT DOCUMENTS

| | | |
|---|---|---|
| JP | 2006-285965 A | 10/2006 |
| JP | 2008-227758 A | 9/2008 |
| JP | 2010-086281 A | 4/2010 |

OTHER PUBLICATIONS

Office Action dated Feb. 28, 2017, which issued during the prosecution of Japanese Patent Application No. 2015-241178, which corresponds to the present application.

Office Action dated Jun. 30, 2015, which issued during the prosecution of Japanese Patent Application No. 2012-117105, which corresponds to the present application.

\* cited by examiner

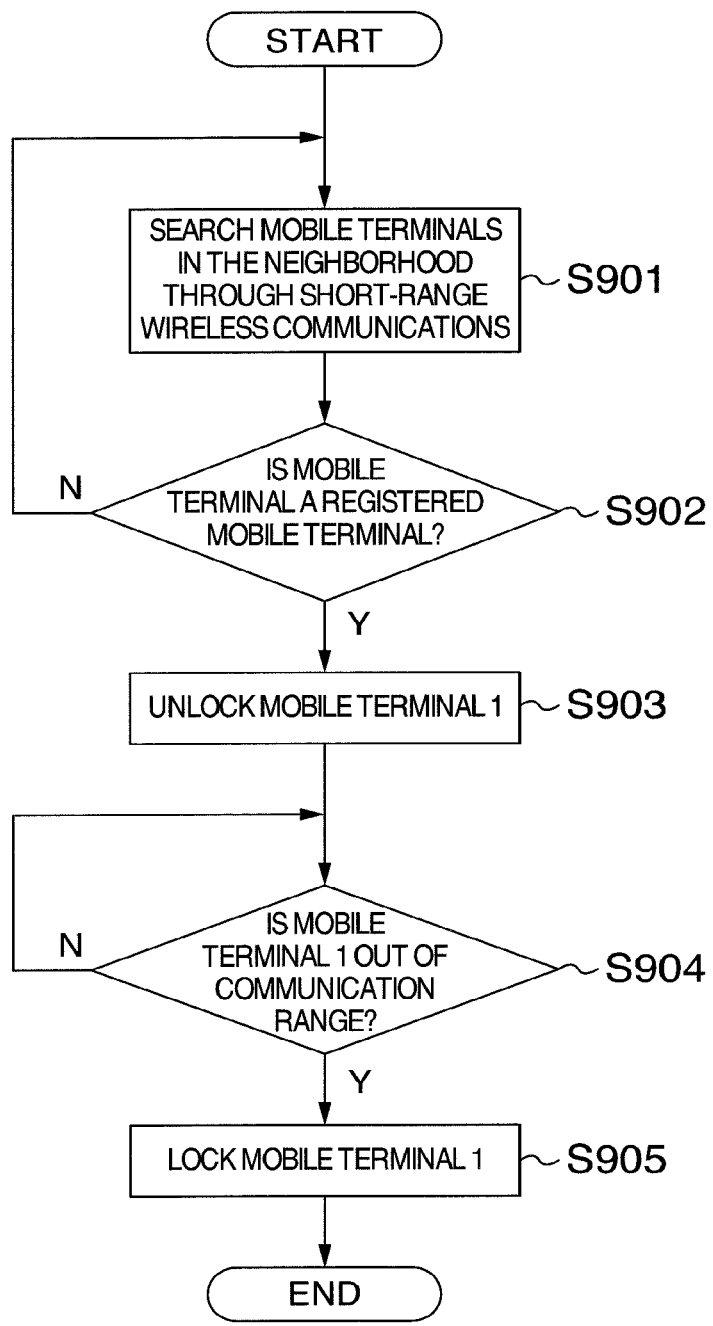

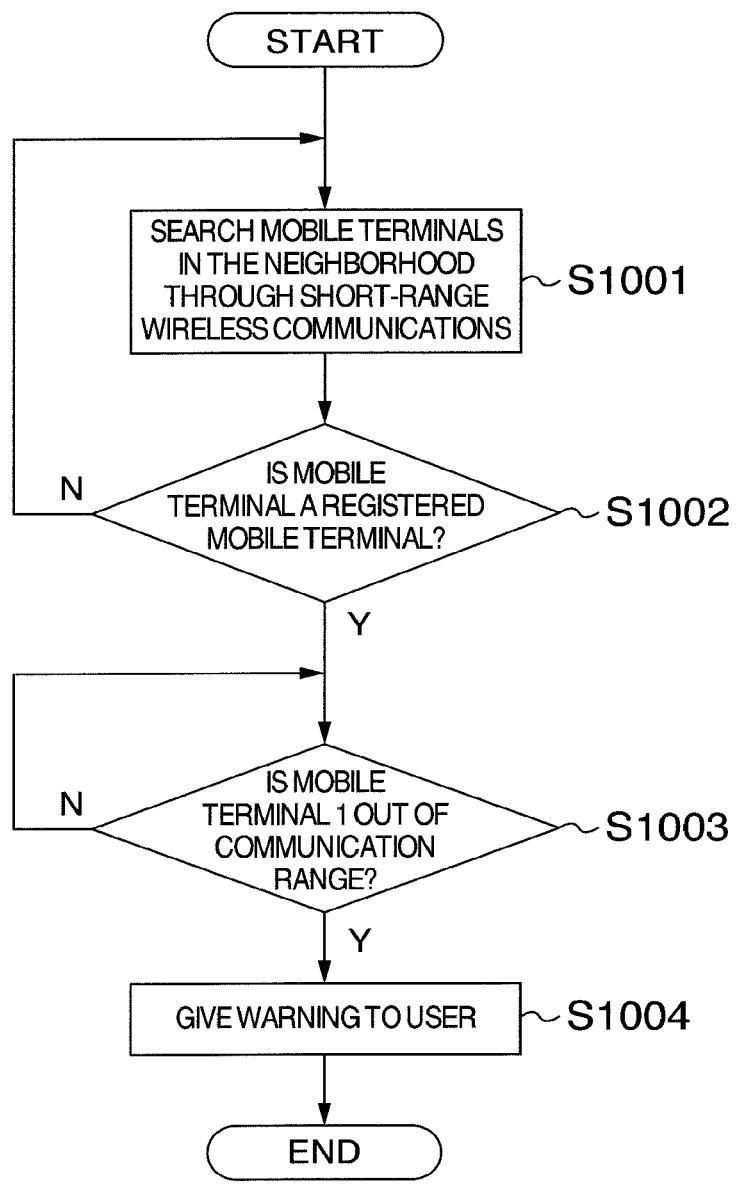

MOBILE TERMINAL AND CONTROL METHOD THEREOF

CROSS REFERENCE TO RELATED APPLICATIONS

This application is a continuation of U.S. patent application Ser. No. 13/874,535 filed May 1, 2013 and entitled "MOBILE TERMINAL AND CONTROL METHOD THEREOF," which is related to and claims priority to Japanese Application No. 2012-117105 filed May 23, 2012, each of which is incorporated herein by reference in its entirety and from each of which priority is claimed.

BACKGROUND OF THE INVENTION

The present invention relates to a mobile terminal and a control method thereof.

As a background art of this technical field, JP-A-2004-102682 is disclosed. In its publication, a problem will be described as below. "According to the conventional schemes described above, therefore, the user of the terminal device needs to make a complex action in order to prevent a third party from making unauthorized use of the terminal device. If the user has inadvertently made the password known or lost the terminal device together with the ID card, then it is impossible to reliably prevent unauthorized use of the terminal device by a third party."

A method for solving this problem will be described as below. "There is provided a terminal lock system for verifying that the user of a terminal device is a person with the legitimate right to use the terminal device for thereby protecting the terminal device against unauthorized use by a third party, the terminal lock system comprising a key device and a terminal-associated device. The key device is portable and has a radio communication means for performing short-range wireless communications. The terminal-associated device requests a connection to the key device through the short-range wireless communications, and inhibits the terminal device which is combined with the terminal-associated device from being used if information of the key device which is confirmed as being connected to the terminal-associated device does not agree with information registered in the terminal-associated device, or if the terminal-associated device is not confirmed as being connected to the key device through the short-range wireless communications."

SUMMARY OF THE INVENTION

In JP-A-2004-102682, the following advantage will be described. "With the above arrangement, when the user who is carrying the key device moves away from the terminal device combined with the terminal-associated device until the terminal-associated device and the key device are no longer capable of connecting to each other based on a short-range wireless communication technique, the terminal-associated device locks the terminal device against use. The terminal lock system thus authenticates the user without the need for asking the user to make any action, and reliably protects the terminal device against unauthorized use by a third party."

However, the user needs to always carry the dedicated key device having a communication function when using the terminal device.

In view of the foregoing, it is an object of the present invention to provide a convenient mobile terminal and control method thereof capable of being protected against unauthorized use by a third party without using the dedicated key device.

The object of the present invention can be attained by the following technical proposal: For example, a plurality of mobile terminals are previously registered mutually. When unlocked among them, one mobile terminal communicates with another mobile terminal in a communication range of the short-range wireless communications, unlocks the above another mobile terminal, and when out of the communication range, locks it again.

According to the present invention, for example, when one mobile terminal is unlocked among a plurality of mobile terminals, another mobile terminal can be unlocked.

Other objects, features and advantages of the invention will become apparent from the following description of the embodiments of the invention taken in conjunction with the accompanying drawings.

BRIEF DESCRIPTION OF THE DRAWINGS

FIG. 9 is a flowchart illustrating operations for locking and releasing a mobile terminal 1 according to a fifth embodiment; and FIG. 10 is a flowchart illustrating a warning operation of a mobile terminal 1 according to a sixth embodiment.

DESCRIPTION OF THE EMBODIMENTS

Hereinafter, preferred embodiments of the present invention will be described with reference to the accompanying drawings of the embodiments.

First Embodiment

Figure 1:
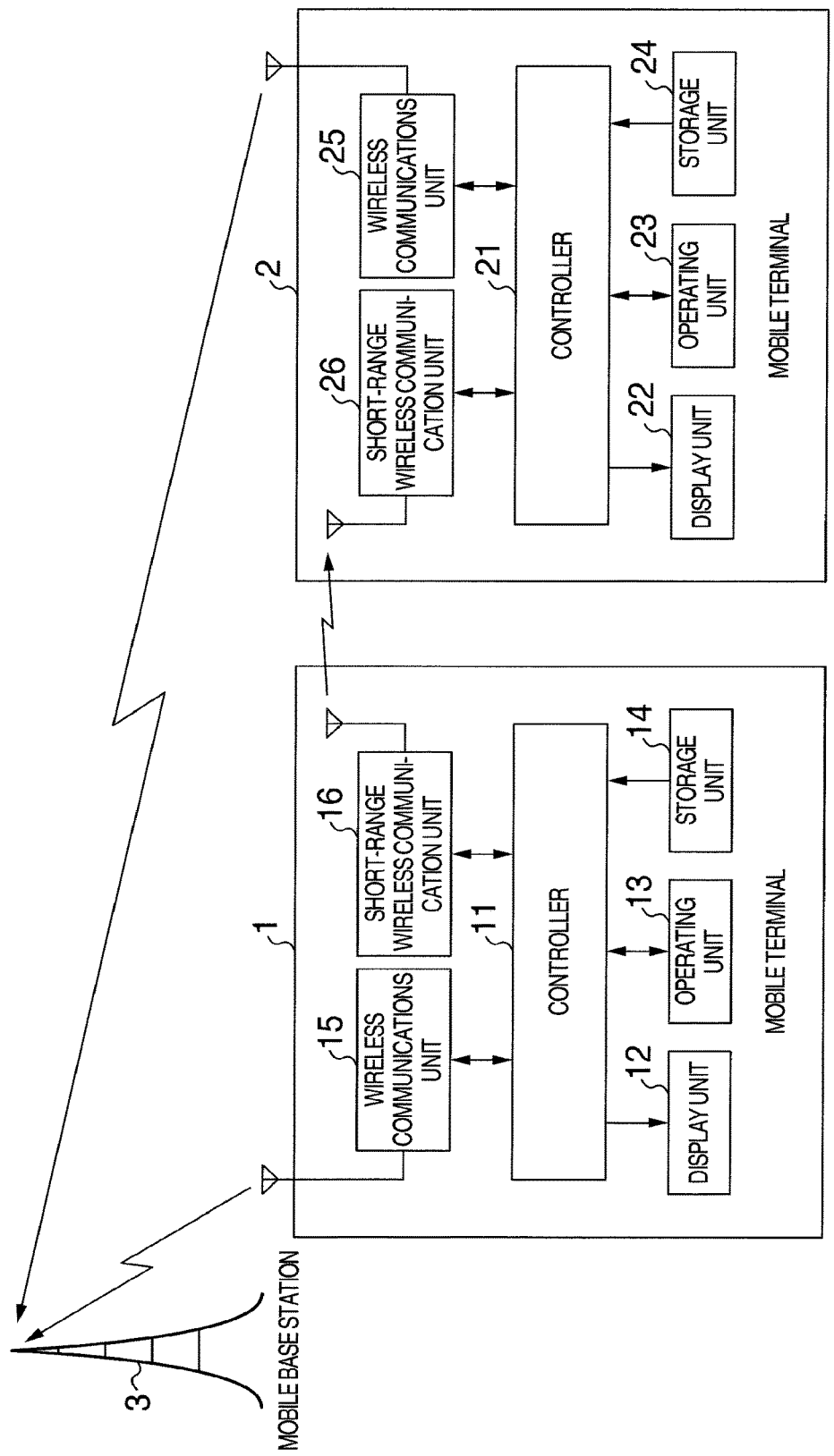
FIG. 1 is a block diagram illustrating a configuration of a mobile terminal according to a first embodiment.

FIG. 1 is a block diagram illustrating a configuration of a mobile terminal according to a first embodiment of the present invention. The mobile terminals 1 and 2 each have a radio communication function, and transmit and receive a variety of information to and from a mobile base station 3. Further, the mobile terminals 1 and 2 each have a function of performing short-range wireless communication between mobile terminals, and can transmit and receive a variety of information between the mobile terminals 1 and 2 by using the function. Examples of the short-range wireless communication include Bluetooth (trademark), infrared rays, and Wi-Fi Direct.

A controller 11 controls each unit of the mobile terminal 1. The controller 11 is configured by a CPU (Central Processing Unit), an arbitrary control circuit, or a dedicated circuit such as an ASIC.

A display unit 12 of the mobile terminal 1 is configured, for example, by a liquid crystal panel, and displays a variety of information. An operating unit 13 is configured, for example, by a push-button switch or a touch panel, and an instruction of a user is transferred to the controller 11. A wireless communications unit 15 and a short-range wireless communication unit 16 are each configured by a communication circuit including an encoding circuit and a decoding circuit in addition to an antenna. The wireless communications unit 15 communicates with the mobile base station 3. The short-range wireless communication unit 16 controls short-range wireless communications and communicates, for example, with the mobile terminal 2.

A storage unit 14 stores a program or various kinds of setting information for controlling a mobile terminal, and a password for unlocking a mobile terminal.

A controller 21, a display unit 22, an operating unit 23, a storage unit 24, and a wireless communications unit 25 of the mobile terminal 2 are the same as the controller 11, the display unit 12, the operating unit 13, the storage unit 14, and the wireless communications unit 15 of the mobile terminal 1, and therefore, descriptions will not be repeated here. A short-range wireless communication unit 26 controls short-range wireless communications, and communicates, for example, with the mobile terminal 1.

Next, descriptions will be made about operations which are set until the mobile terminal 2 is unlocked after the mobile terminal 1 is unlocked.

In addition, the locked state of the present embodiment is a state in which functions or operations of part or the whole of a mobile terminal are limited.

When the user refers to the display unit 12 of the mobile terminal 1 and operates the operating unit 13 so as to release a locked state, the mobile terminal 1 searches whether another mobile terminal is in a short-distance communication range capable of performing short-range wireless communications. The mobile terminal 1 further confirms whether it is the mobile terminal 2 being a previously registered mobile terminal. When the mobile terminal 1 confirms that information stored in the storage unit 14 is matched with that of the storage unit 24 and it is the previously registered mobile terminal, the mobile terminal 2 is unlocked.

The mobile terminals 1 and 2 are supposed to transit to a locked state when not operated for a given length of time and, for example, a password is supposed to need to be entered in order to release the locked state. The given length of time is, for example, thirty seconds. Further, the mobile terminals 1 and 2 are previously registered so as to be mutually locked and unlocked through short-range wireless communications.

An example where the mobile terminals 1 and 2 each have a radio communication function with the mobile base station 3 is illustrated. Further, the mobile terminal 1 and/or mobile terminal 2 may each have a wireless LAN (Local Area Network) function, and transmit and receive a variety of information to and from a wireless LAN router.

Figure 2:
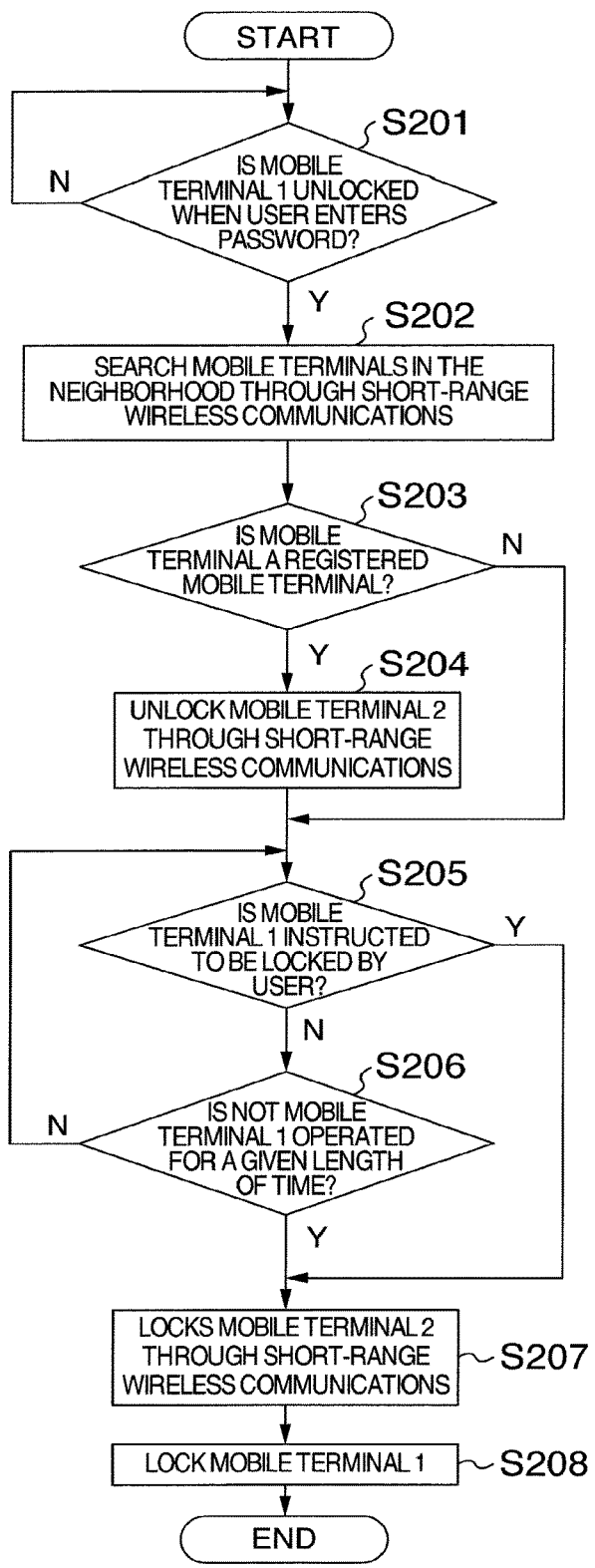
FIG. 2 is a flowchart illustrating operations for locking and releasing a mobile terminal 1 according to a first embodiment.

FIG. 2 is a flowchart illustrating operations of locking and unlocking the mobile terminal 1 according to the first embodiment.

First, at step S201, the mobile terminal 1 confirms whether to be unlocked when the user enters a password. The mobile terminal 1 continues to wait for unlocking until the locked state is released, and when it is unlocked, the process proceeds to step S202. An example where the user enters a password is described here, and biometrics authentication may be further used.

At step S202, the mobile terminal 1 searches mobile terminals in the neighborhood through short-range wireless communications. For example, the mobile terminal 1 transmits radio waves used for the short-range wireless communications and searches for a mobile terminal in which the short-range wireless communications are established by receiving the radio waves.

At step S203, the mobile terminal 1 determines whether there is a mobile terminal in the neighborhood and it is the previously registered mobile terminal, and switches the process. If so, the process advances to step S204. If not, the process proceeds to step S205.

At step S204, the mobile terminal 1 unlocks the previously registered mobile terminal 2 through the short-range wireless communications. For example, the mobile terminal 1 transmits a signal for instructing the mobile terminal 2 to be unlocked thereto. Here, the mobile terminals 1 and 2 are supposed to be previously registered mutually by the same user.

At step S205, the mobile terminal 1 confirms whether to be instructed to be locked by the user. If so, the process proceeds to step S207. At step S206, the mobile terminal 1 further confirms whether not to be operated for a given length of time. If not, the process proceeds to step S207. If so, the process returns to step S205.

At step S207, the mobile terminal 1 locks the previously registered mobile terminal 2 through the short-range wireless communications. For example, the mobile terminal 1 transmits a signal for instructing the mobile terminal 2 to be locked thereto.

At step S208, the mobile terminal 1 is locked.

Figure 3:
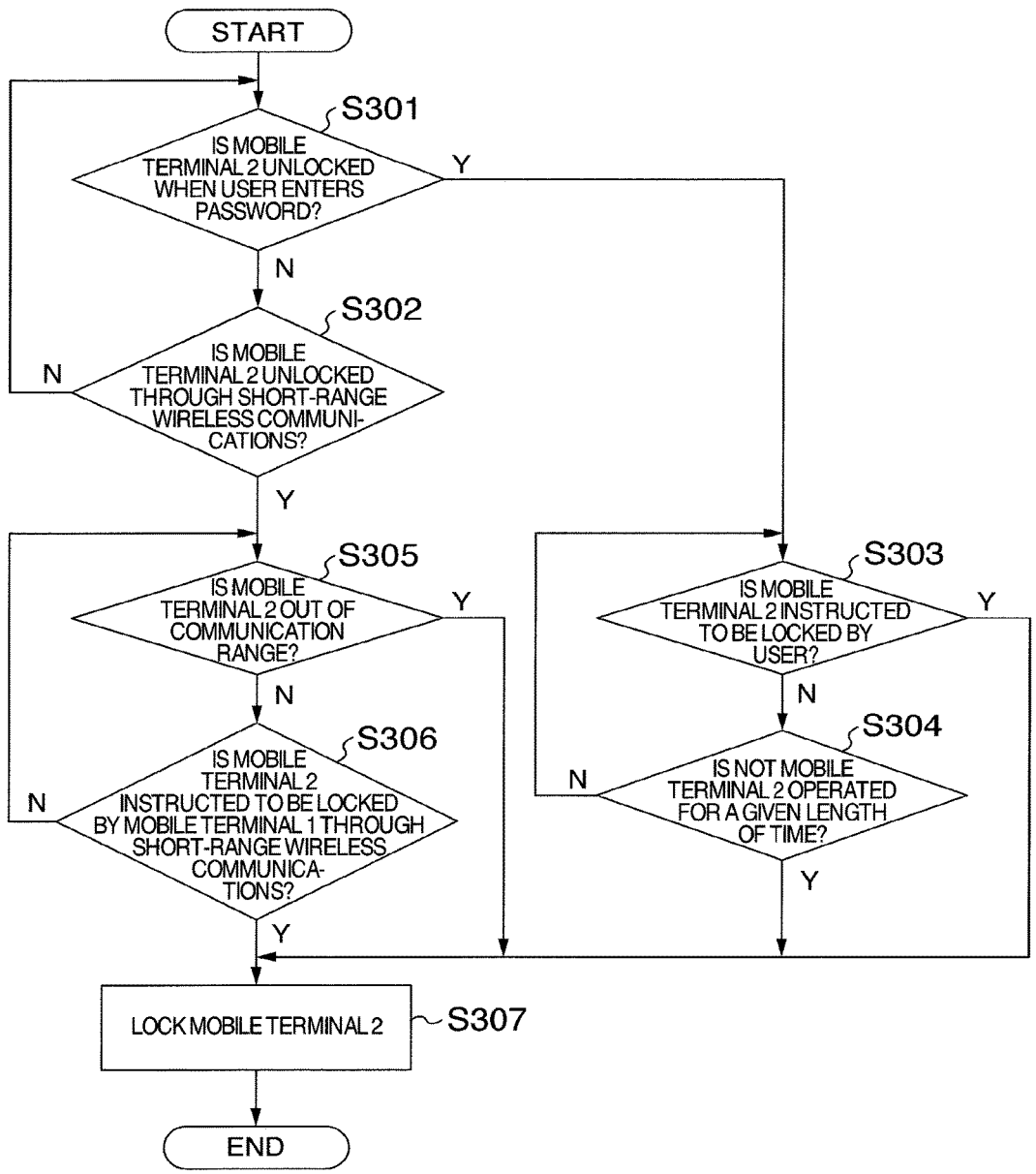
FIG. 3 is a flowchart illustrating operations for locking and releasing a mobile terminal 2 according to a first embodiment.

FIG. 3 is a flowchart illustrating operations for locking and unlocking the mobile terminal 2 according to the first embodiment.

First, at step S301, the mobile terminal 2 confirms whether to be unlocked when the user enters a password. If so, the process proceeds to step 5303. At step S302, the mobile terminal 2 further confirms whether to be unlocked through the short-range wireless communications. If so, the process proceeds to step S305. If not, the process returns to step S301.

At step S303, the mobile terminal 2 confirms whether to be instructed to be locked by the user. If so, the process proceeds to step S307. At step S304, the mobile terminal 2 further confirms whether not to be operated for a given length of time. If not, the process proceeds to step S307. If so, the process returns to step S303.

At step S305, the mobile terminal 2 confirms whether to be out of the communication range of the short-range wireless communications with the mobile terminal 1.

If so, the process proceeds to step S307. At step S306, the mobile terminal 2 further confirms whether to be instructed to be locked by the mobile terminal 1 through the short-range wireless communications. If so, the process proceeds to step S307. If not, the process returns to step S305.

At step 5307, the mobile terminal 2 is locked.

In addition, the mobile terminal I may detect that the short-range wireless communications established with the mobile terminal 2 is broken, and transmit a signal for instructing the mobile terminal 2 to be locked thereto immediately before the communication is broken.

In the first embodiment of the present invention, a plurality of mobile terminals are previously registered mutually through the above configuration. When one mobile terminal is unlocked among them, another mobile terminal is unlocked in the communication range of the short-range wireless communications. When out of the communication range, the another mobile terminal can be locked again.

In the present embodiment, an example where two mobile terminals are locked and unlocked is described; similarly, three or more mobile terminals can be further locked and unlocked.

Second Embodiment

Figure 4:
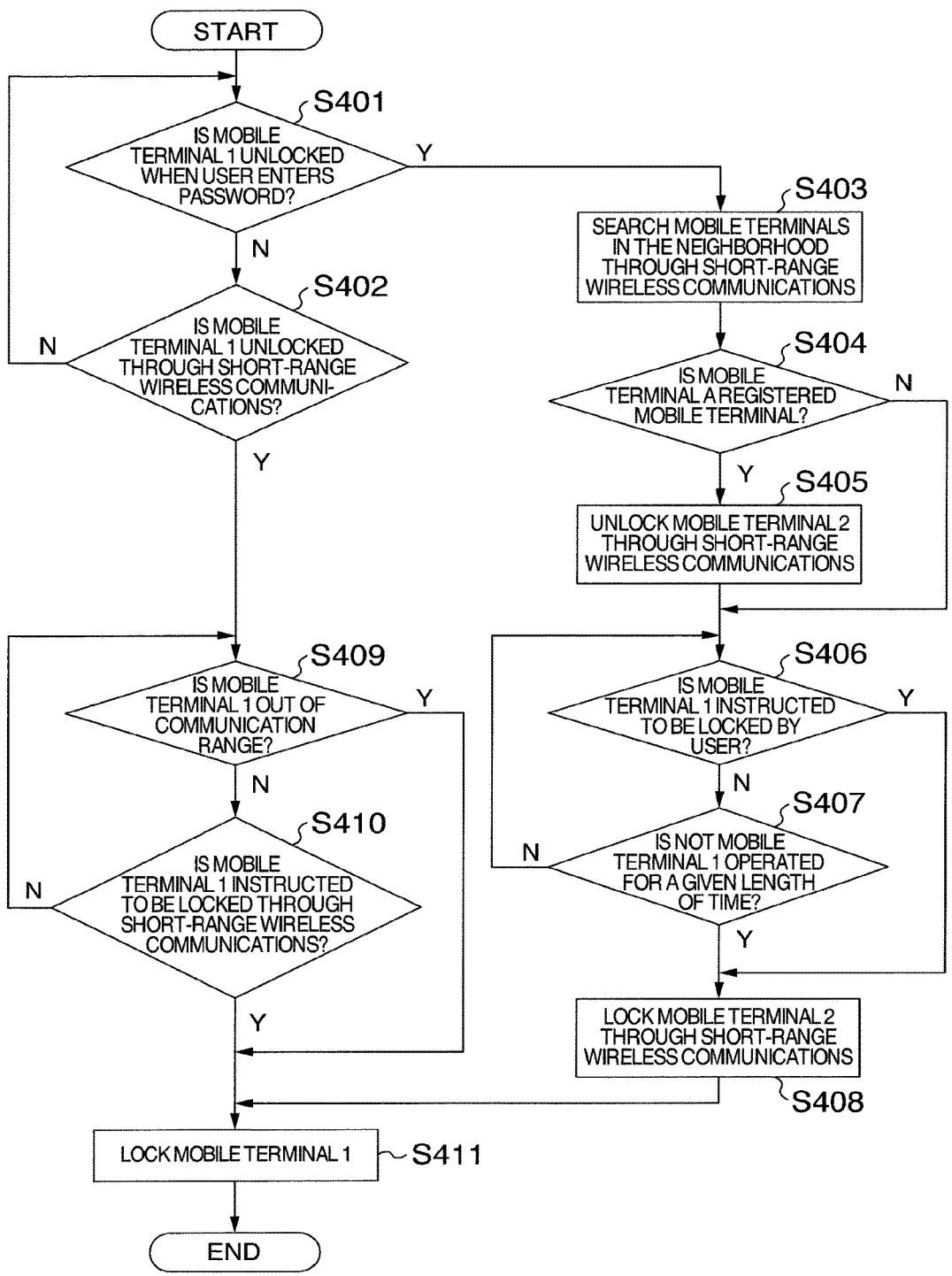
FIG. 4 is a flowchart illustrating operations for locking and releasing a mobile terminal 1 according to a second embodiment.

FIG. 4 is a flowchart illustrating operations for locking and unlocking the mobile terminal 1 according to a second embodiment of the present invention. The mobile terminal has the same configuration as that of the first embodiment, and therefore descriptions will not be repeated here.

First, at step S401, the mobile terminal 1 confirms whether to be unlocked when the user enters a password. If so, the process proceeds to step S403. At step S402, the mobile terminal 1 further confirms whether to be unlocked through the short-range wireless communications. If so, the process proceeds to step 5409.

Steps S403 to S408 are the same as steps 5202 to 5207 of FIG. 2, and therefore descriptions will not be repeated here.

At step 5409, the mobile terminal 1 confirms whether to be out of the communication range of the short-range wireless communications with the mobile terminal 2.

If so, the process proceeds to step S411. At step S410, the mobile terminal 1 further confirms whether to be instructed to be locked through the short-range wireless communications. If so, the process proceeds to step S411. If not, the process returns to step S409.

At step S411, the mobile terminal 1 is locked.

Figure 5:
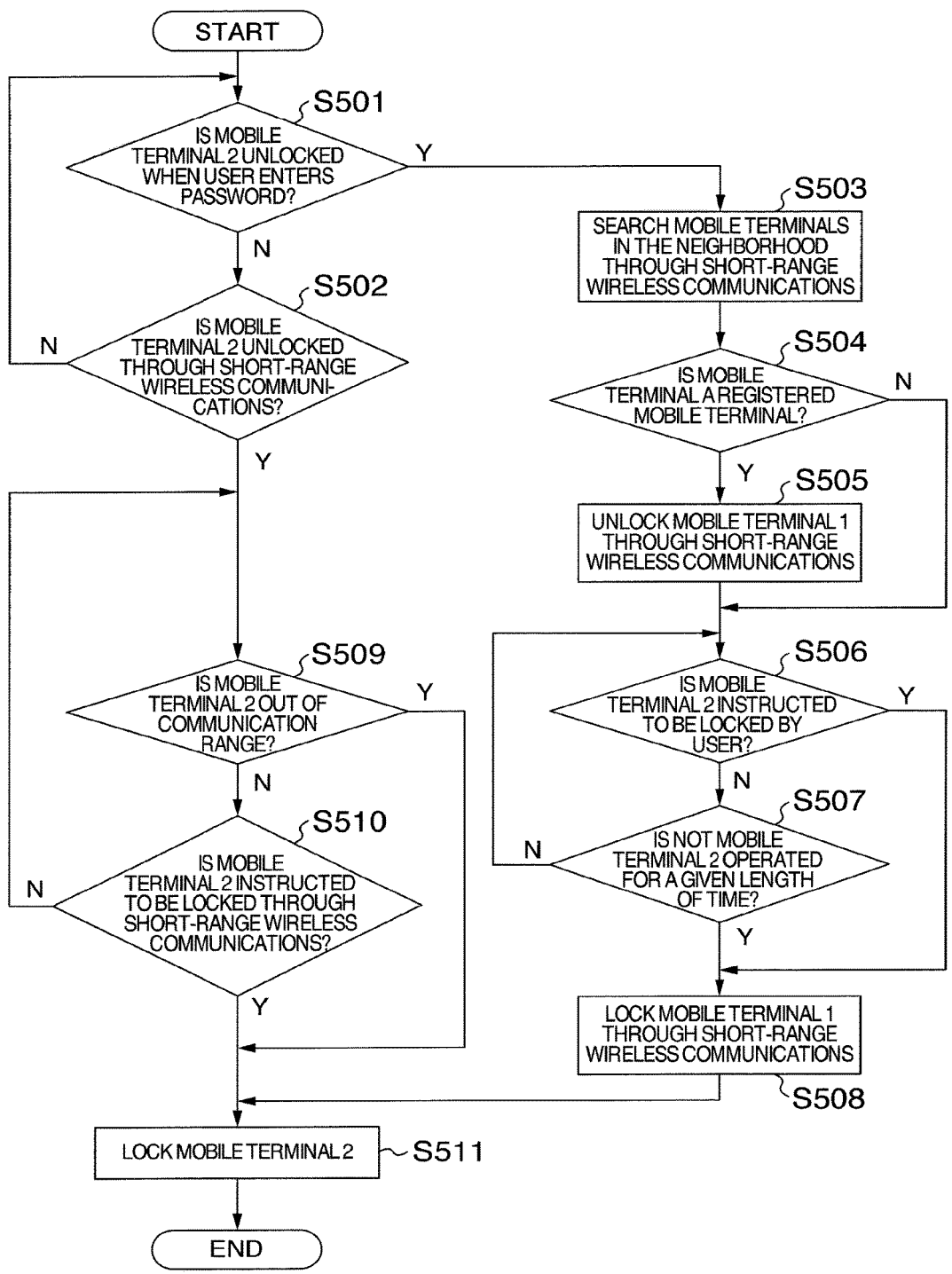
FIG. 5 is a flowchart illustrating operations for locking and releasing a mobile terminal 2 according to a second embodiment.

FIG. 5 is a flowchart illustrating operations for locking and unlocking the mobile terminal 2 according to the second embodiment.

First, at step S501, the mobile terminal 2 confirms whether to be unlocked when the user enters a password. If so, the process proceeds to step S503. At step 5502, the mobile terminal 2 further confirms whether to be unlocked through the short-range wireless communications. If so, the process proceeds to step S509.

Steps S503 and S504 are the same as steps S403 and S404 of FIG. 4, and therefore descriptions will not be repeated here.

At step S505, the mobile terminal 2 unlocks the previously registered mobile terminal 1 through the short-range wireless communications.

At step S506, the mobile terminal 2 confirms whether to be instructed to be locked by the user. If so, the process proceeds to step S508. At step S507, the mobile terminal 2 further confirms whether not to be operated for a given length of time. If not, the process proceeds to step 5508.

At step 5508, the mobile terminal 2 locks the previously registered mobile terminal 1 through the short-range wireless communications.

At step S509, the mobile terminal 2 confirms whether to be out of the communication range of the short-range wireless communications with the mobile terminal 1. If so, the process proceeds to step S511. At step 5510, the mobile terminal 2 further confirms whether to be instructed to be locked through the short-range wireless communications. If so, the process proceeds to step 5511. If not, the process returns to step S509.

At step S511, the mobile terminal 2 is locked.

In the second embodiment of the present invention, a plurality of mobile terminals are previously registered mutually through the above configuration. When one mobile terminal is unlocked among them, another mobile terminal is unlocked in the communication range of the short-range wireless communications. When out of the communication range, the another mobile terminal can be locked again.

First, any mobile terminal may be unlocked. Even if any mobile terminal is unlocked, another mobile terminal can be unlocked, and therefore the mobile terminal of the second embodiment is more convenient than that of the first embodiment.

In the present embodiment, an example where two mobile terminals are locked and unlocked is described; similarly, three or more mobile terminals can be further locked and unlocked.

Third Embodiment

Figure 6:
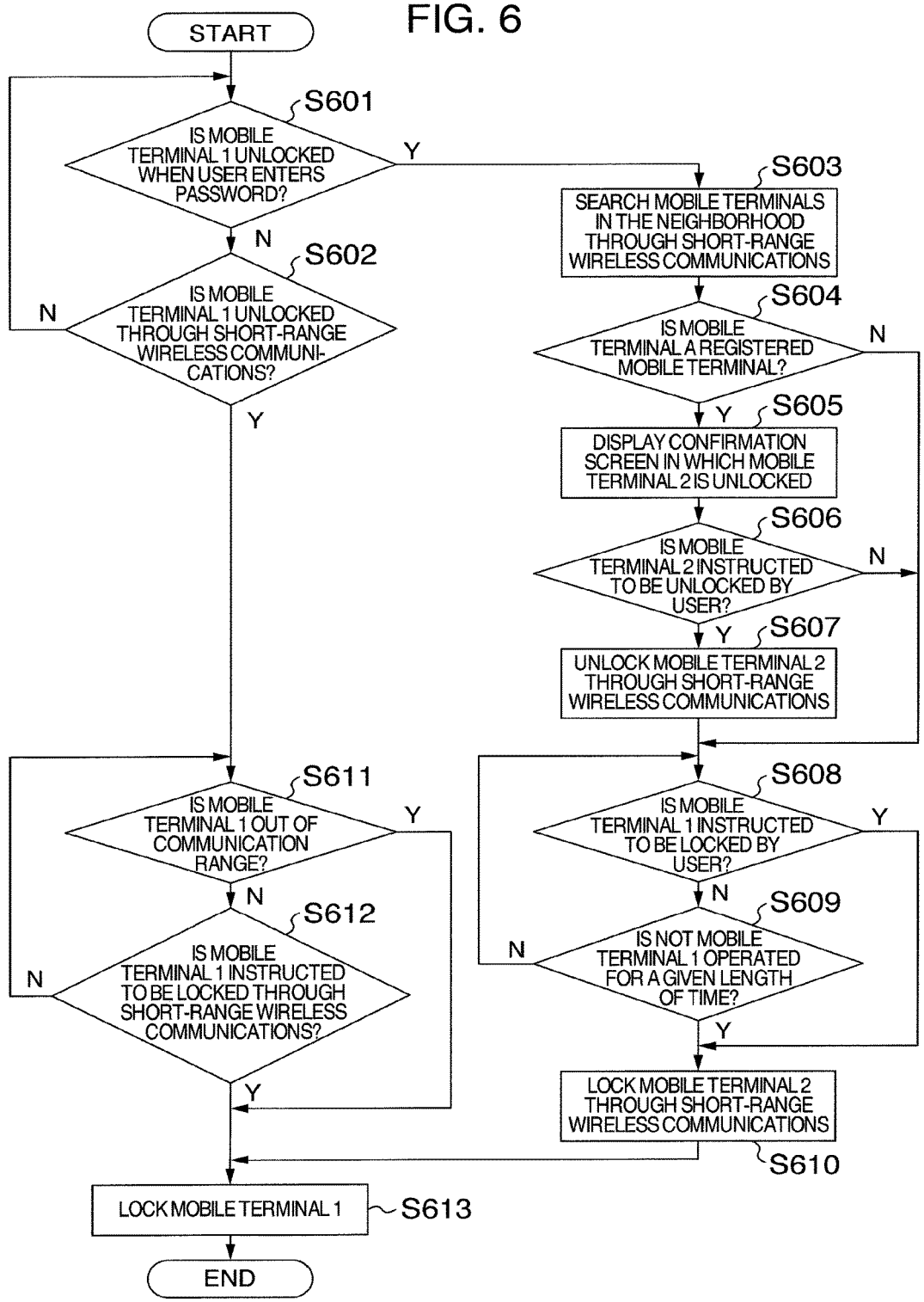
FIG. 6 is a flowchart illustrating operations for locking and releasing a mobile terminal 1 according to a third embodiment.

FIG. 6 is a flowchart illustrating operations for locking and unlocking the mobile terminal 1 according to a third embodiment of the present invention. The mobile terminal has the same configuration as that of the first embodiment, and therefore descriptions will not be repeated here.

Steps 5601 to 5604 are the same as steps 5401 to 5404 of FIG. 4, and therefore descriptions will not be repeated here.

At step 5605, the mobile terminal 1 displays a confirmation screen in which the mobile terminal 2 is unlocked. A display example will be described later.

At step 5606, the mobile terminal 1 confirms whether the user instructs the mobile terminal 2 to be unlocked. If so, the process advances to step 5607. If not, the process proceeds to step 5608.

Steps 5608 to 5613 are the same as steps 5406 to 5411 of FIG. 4, and therefore descriptions will not be repeated here.

Figure 7:
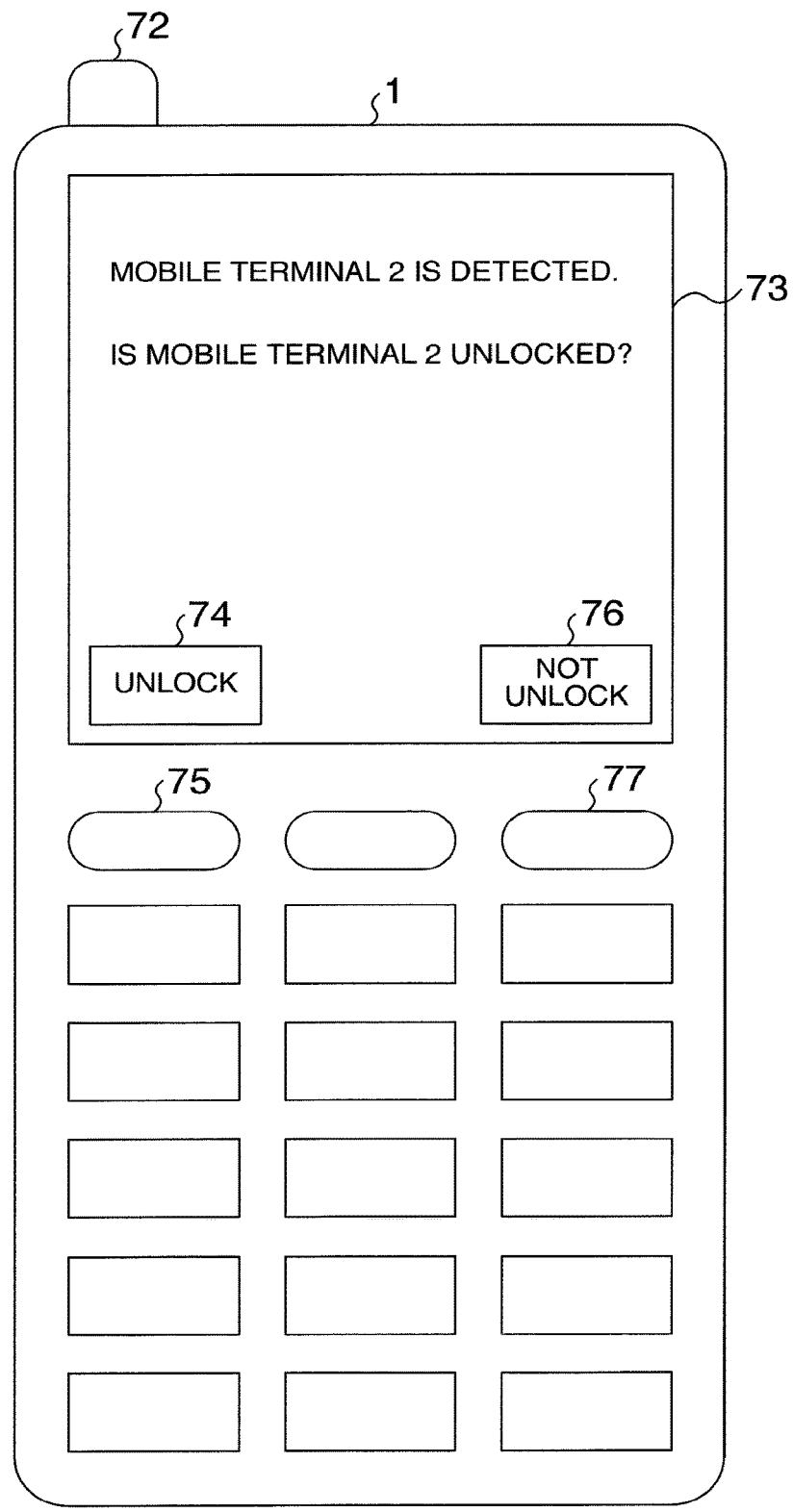
FIG. 7 is a display example illustrating a liquid crystal panel of a mobile terminal according to a third embodiment.

FIG. 7 is a display example illustrating a liquid crystal panel of the mobile terminal I at the time of detecting the mobile terminal 2 through the short-range wireless communications at step 5605 of FIG. 6. A detection report of the mobile terminal 2, a selection button, and non-selection button of the unlocking are displayed on the liquid crystal panel. When detecting the mobile terminal 2 through the short-range wireless communications, the mobile terminal 1 transits to an unlocking selection mode. On the liquid crystal panel 73, an unlocking selection button 74 and an unlocking non-selection button 76 are displayed. When the user pushes a push-button switch 75 corresponding to the unlocking selection button 74, the mobile terminal 2 is unlocked. When the user pushes a push-button switch 77 corresponding to the unlocking non-selection button 76, the mobile terminal 1 releases the unlocking selection mode and returns to a normal mode.

In the third embodiment of the present invention, a plurality of mobile terminals are previously registered mutually through the above configuration. When one mobile terminal is unlocked among them, another mobile terminal is unlocked in the communication range of the short-range wireless communications. When out of the communication range, the another mobile terminal can be locked again.

Further, upon detection of another mobile terminal, the user can select whether to unlock it.

Fourth Embodiment

Figure 8:
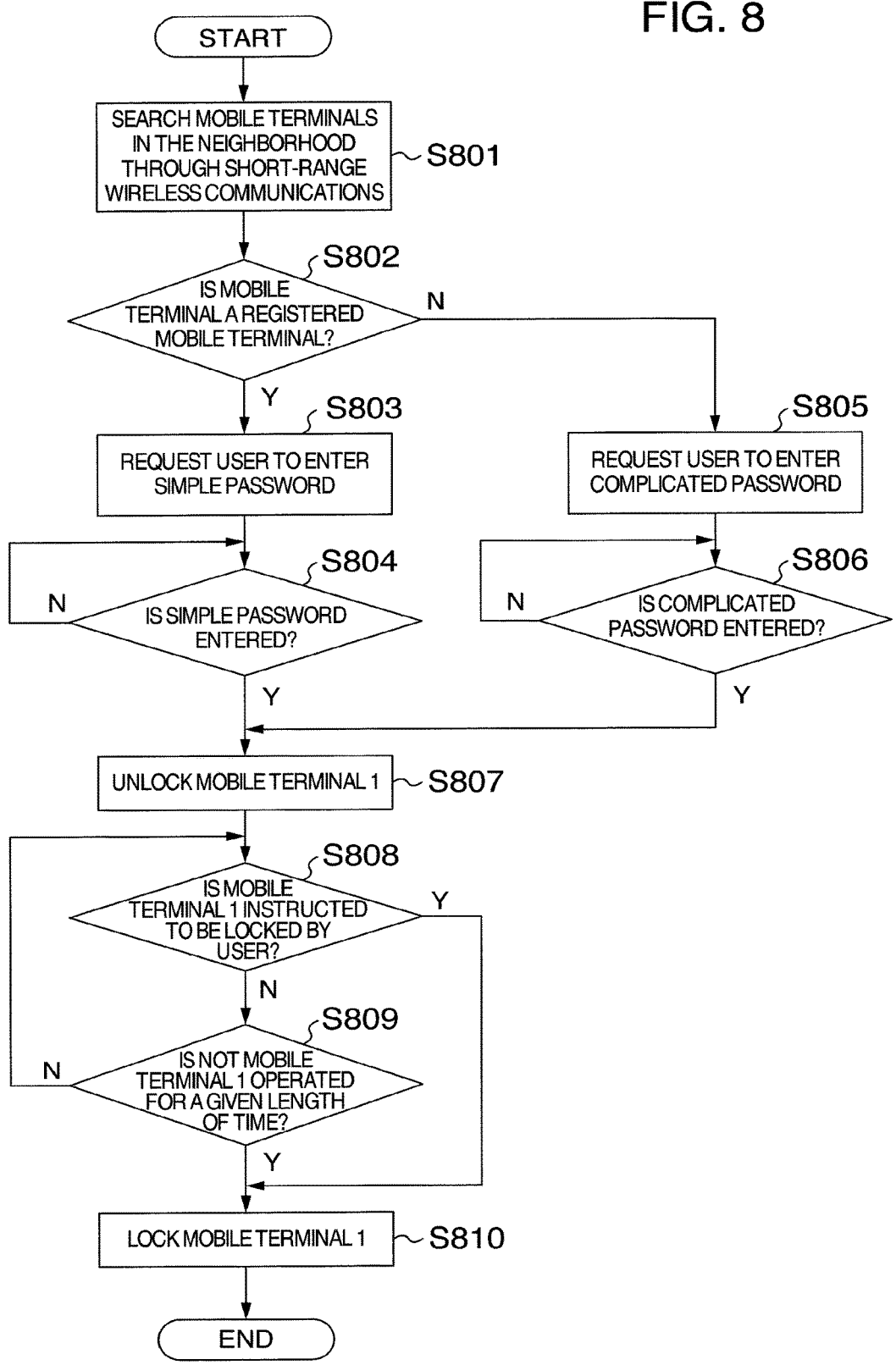
FIG. 8 is a flowchart illustrating operations for locking and releasing a mobile terminal 1 according to a fourth embodiment.

FIG. 8 is a flowchart illustrating operations for locking and unlocking the mobile terminal 1 according to a fourth embodiment of the present invention. The mobile terminal has the same configuration as that of the first embodiment, and therefore descriptions will not be repeated here.

First, at step 5801, the mobile terminal 1 searches mobile terminals in the neighborhood through the short-range wireless communications.

At step 5802, the mobile terminal 1 determines whether there is a mobile terminal in the neighborhood and it is the previously registered mobile terminal, and switches the process. If so, the process advances to step 5803. If not, the process proceeds to step 5805.

At step S803, the mobile terminal 1 requests the user to enter a simple password, and continues to wait until it is correctly entered at step S804. When the simple password is entered, the process proceeds to step 5807.

At step 5805, the mobile terminal 1 requests the user to enter a complicated password, and continues to wait until it is correctly entered at step S806. When the complicated password is entered, the process proceeds to step S807.

The simple password is, for example, a three-character number, and the complicated password is, for example, a ten-character number. That is, strengths of both passwords are different from each other.

At step 5807, the mobile terminal 1 is unlocked. Here, the mobile terminals 1 and 2 are supposed to be previously registered mutually by the same user.

At step 5808, the mobile terminal 1 confirms whether to be instructed to be locked by the user. If so, the process proceeds to step 5810. At step 5809, the mobile terminal 1 further confirms whether not to be operated for a given length of time. If not, the process proceeds to step 5810.

At step 5810, the mobile terminal 1 is locked.

Operations for locking and unlocking the mobile terminal 2 are the same as those of the mobile terminal 1.

In the fourth embodiment of the present invention, a plurality of mobile terminals are previously registered mutually through the above configuration. When both mobile terminals are in the communication range of the short-range wireless communications, an authentication level for unlocking the mobile terminal is simplified. When both the mobile terminals are out of the communication range of the short-range wireless communications, an authentication level for unlocking the mobile terminal is detailed. Therefore, as compared to a case of simply fixing the authentication level, safety is high. On the other hand, as compared to a case of fixing the authentication level in detail, usability is preferable.

In the present embodiment, an example where the number of characters of the password is changed is described as switching of the authentication level. Further, there may be changed a principal matching rate of biometrics authentication such as face and finger authentication types, or a character matching rate of character authentication.

In the present embodiment, an example where two mobile terminals are locked and unlocked is described; similarly, three or more mobile terminals can be further locked and unlocked.

Fifth Embodiment

FIG. 9 is a flowchart illustrating operations for locking and unlocking the mobile terminal 1 according to a fifth embodiment of the present invention. The mobile terminal has the same configuration as that of the first embodiment, and therefore descriptions will not be repeated here.

First, at step 5901, the mobile terminal 1 searches mobile terminals in the neighborhood through the short-range wireless communications.

At step 5902, the mobile terminal 1 determines whether there is a mobile terminal in the neighborhood and it is the previously registered mobile terminal, and switches the process. If so, the process proceeds to step 5903. If not, the process returns to step 5901.

At step 5903, the mobile terminal 1 is unlocked. Here, the mobile terminals 1 and 2 are supposed to be previously registered mutually by the same user.

At step 5904, the mobile terminal 1 confirms whether to be out of the communication range of the short-range wireless communications with the mobile terminal 2. The mobile terminal 1 continues to wait until out of the communication range. When the mobile terminal 1 is out of the communication range, the process proceeds to step 5905.

At step 5905, the mobile terminal 1 is locked.

Operations for locking and unlocking the mobile terminal 2 are the same as those of the mobile terminal 1.

In the fifth embodiment of the present invention, a plurality of mobile terminals are previously registered mutually through the above configuration. When in the communication range of the short-range wireless communications, they are mutually unlocked. When out of the communication range, they are locked again. Therefore, the mobile terminal of the present embodiment is more convenient than those of the first and second embodiments.

In the present embodiment, an example where two mobile terminals are locked and unlocked is described; similarly, three or more mobile terminals can be further locked and unlocked.

Sixth Embodiment

FIG. 10 is a flowchart illustrating a warning operation of the mobile terminal 1 according to a sixth embodiment of the present invention. The mobile terminal has the same configuration as that of the first embodiment, and therefore descriptions will not be repeated here.

First, at step S1001, the mobile terminal 1 searches mobile terminals in the neighborhood through the short-range wireless communications.

At step S1002, the mobile terminal I determines whether there is a mobile terminal in the neighborhood and it is the previously registered mobile terminal, and switches the process.

If so, the process proceeds to step SI003. If not, the process returns to step SI001.

At step S1003, the mobile terminal 1 confirms whether to be out of the communication range of the short-range wireless communications with the mobile terminal 2.

If so, the process proceeds to step S1004. If not, the process returns to step S1003.

At step S1004, the mobile terminal 1 gives warning to the user through sounds or vibrations. Alternatively, the mobile terminal 1 sends a mail to another mobile terminal. At this time, when having a GPS (Global Position System) function, the mobile terminal I may transmit positional information to the another mobile terminal.

The warning operation of the mobile terminal 2 is the same as that of the mobile terminal 1.

In the sixth embodiment of the present invention, a plurality of mobile terminals are previously registered mutually through the above configuration. In the case where they are once in the communication range of the short-range wireless communications, upon being out of the communication range next, the mobile terminal 1 notifies the user of that effect, thereby preventing the mobile terminals from being lost.

Suppose, for example, that the present embodiment is combined with the first embodiment. In this case, the mobile terminal 2 can notify the user that the mobile terminal 2 is locked because of moving to the outside of the communication range of the short-range wireless communications with the mobile terminal 1.

In the present embodiment, an example where two mobile terminals perform a warning operation is described; similarly, three or more mobile terminals can further perform a warning operation.

In addition, the above-described embodiments are described in detail in order to clearly describe the present invention, and are not necessarily limited to the mobile terminal having all the described constructions. Further, a part of configurations according to one embodiment can be replaced by those according to other embodiments, and the configurations according to other embodiments can be added to that according to one embodiment. Further, an addition, deletion, or replacement of the configurations according to other embodiments can be performed by using a part of the configurations according to each embodiment.

A part or all of the respective structures, functions, processing units, and processing approaches may be realized by hardware by designing through the integrated circuit, for example. Those structures, functions and the like may be realized by software by interpreting and executing the program for realizing the respective functions through a processor. Information with respect to the program, table, and file for realizing the respective functions may be stored in the recording unit such as the memory, hard disk, and SSD (Solid State Drive), or the recording medium such as the IC card and SD card.

The examples show the control line and information line considered as necessary for the explanation, which does not necessarily show all the control lines and information lines of the product. Actually, almost all the components may be considered to be connected with one another.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile terminal configured to switch between an unlocked state and a locked state in which unauthorized access of the mobile terminal is prevented, comprising:
    a transceiver which performs short-range wireless communications;
    a memory storing information about an another mobile terminal, wherein the mobile terminal and the another mobile terminal are mutually registered such that they are associated with a same user; and
    a processor which switches the mobile terminal from a locked state to an unlocked state based on an authentication input to the mobile terminal, wherein the locked state prevents unauthorized access to the mobile terminal, wherein, when conditions are met, the processor controls the mobile terminal to transmit information to the another mobile terminal via short-range wireless communications for switching a state of the another mobile terminal from a locked state to an unlocked state, wherein the conditions include:
        first, the mobile terminal is in a locked state, the another mobile terminal is in a locked state, and the another mobile terminal is within communication range of the short-range wireless communications of the transceiver while in the locked state;
        second, after the mobile terminal is in the locked state, the another mobile terminal is in the locked state, and the another mobile terminal is within communication range of the short-range wireless communications of the transceiver while in the locked state, performing, via the transceiver, the short-range wireless communications with the another mobile terminal; and
        third, after performing the short-range wireless communications with the another mobile terminal, receiving, by the processor, the authentication input for switching the mobile terminal from the locked state to the unlocked state.

2. The mobile terminal according to claim 1, wherein switching the mobile terminal from the locked state to the unlocked state includes an operation based on a biometrics authentication.

3. The mobile terminal according to claim 2, wherein the transceiver, based on the authentication input, transmits, to the another mobile terminal, a signal to transit the another mobile terminal to a locked state by performing the short-range wireless communications.

4. The mobile terminal according to claim 2, wherein before unlocking the another mobile terminal, the mobile terminal requests confirmation from a user.

5. The mobile terminal according to claim 2, wherein the processor controls short-range wireless communications with the another mobile terminal by the transceiver and sets the mobile terminal to be in an unlocked state when the another mobile terminal is stored in the memory and is in communication range of the short-range wireless communications by the transceiver when the mobile terminal is in a locked state.

6. The mobile terminal according to claim 1, further configured to store information about two or more additional mobile terminals.

7. The mobile terminal according to claim 1, wherein the short-range wireless communication is performed via a Bluetooth connection.

8. The mobile terminal according to claim 1, wherein the short-range wireless communication is via an infrared or a Wi-Fi connection.

9. A method for controlling a mobile terminal to transit between an unlocked state and a locked state in which unauthorized access of the mobile terminal is prevented, comprising the steps of:
    performing short-range wireless communications;
    storing information about an another mobile terminal in a memory, wherein the mobile terminal and the another mobile terminal are mutually registered such that they are associated with a same user; and
    transmitting information via short-range wireless communications from the mobile terminal to the another mobile terminal which is for switching a state of the another mobile terminal from a locked state to an unlocked state when conditions are met, wherein the locked state prevents unauthorized access to the mobile terminal, and wherein the conditions include:
        first, the mobile terminal is in a locked state; the another mobile terminal is in a locked state, and the another mobile terminal is in communication range of the shortrange wireless communications of the first mobile terminal;

second, after the mobile terminal is in the locked state, the another mobile terminal is in the locked state, and the another mobile terminal is within communication range of the short-range wireless communications of the first mobile terminal, performing, via the mobile terminal, the short-range wireless communication with the another mobile terminal; and third, after the performing of the short-range wireless communication with the another mobile terminal, receiving the authentication input by the mobile terminal for switching the mobile terminal from the locked state to the unlocked state.

10. The method according to claim 9, wherein switching the mobile terminal from the locked state to the unlocked state includes an operation based on a biometrics authentication.

11. The method according to claim 10, further comprising:

transmitting, based on the operation, a signal to the another mobile terminal to transit the another mobile terminal to a locked state by performing the short-range wireless communications.

12. The method according to claim 10, further comprising:

performing short-range wireless communications with the another mobile terminal and setting the mobile terminal to be in an unlocked state when the another mobile terminal is stored in the memory and is in communication range of the short-range wireless communications when the mobile terminal is in a locked state.

13. The method according to claim 9, further comprising the step of storing information about two or more additional mobile terminals.

14. The method according to claim 9, wherein the short-range wireless communication is performed via a Bluetooth connection.

15. The method according to claim 9, wherein the short-range wireless communication is performed via an infrared or a Wi-Fi connection.

16. A lock state control system comprising:

a first mobile terminal configured to switch between an unlocked state and a locked state in which unauthorized access of the mobile terminal is prevented, and the locked state prevents unauthorized access to the first mobile terminal; and a second mobile terminal configured to switch between an unlocked state and a locked state in which unauthorized access of the second mobile terminal is prevented, wherein the first mobile terminal comprises:

a transceiver which performs short-range wireless communications;

a memory storing information about the second mobile terminal, wherein the first mobile terminal and the second mobile terminal are mutually registered such that they are associated with a same user; and a processor which switches the first mobile terminal from the locked state to the unlocked state based on an authentication input to the first mobile terminal from a user, wherein, when conditions are met, the processor controls the first mobile terminal to transmit information to the second mobile terminal for switching a state of the second mobile terminal from a locked state to an unlocked state, wherein the conditions include:

first, the first mobile terminal and the second mobile terminal are in a locked state, and the second mobile terminal is in communication range of the short-range wireless communications of the transceiver;

second, after the first mobile terminal and the second mobile terminal are in the locked state, and the second mobile terminal is in communication range of the short-range wireless communications of the transceiver, performing, via the first mobile terminal, the short-range wireless communications with the second mobile terminal; and third, after performing the short-range wireless communications with the second mobile terminal, receiving, via the first mobile terminal, the authentication input for switching a state of the first mobile terminal from a locked state to an unlocked state.

17. The lock state control system according to claim 16, wherein switching the first mobile terminal from the locked state to the unlocked state includes an operation based on a biometrics authentication.

18. The lock state control system according to claim 16, wherein the memory stores two or more additional mobile terminals.

19. The lock state control system according to claim 16, wherein the short-range wireless communications are performed via a Bluetooth connection.

20. The lock state control system according to claim 16, wherein the short-range wireless communications are performed via an infrared or a Wi-Fi connection.

* * * * *

UNITED STATES PATENT AND TRADEMARK OFFICE
CERTIFICATE OF CORRECTION

PATENT NO. : 10,264,456 B2
APPLICATION NO. : 16/170222
DATED : April 16, 2019
INVENTOR(S) : Masayuki Hirabayashi and Hideo Nishijima Page 1 of 1

It is certified that error appears in the above-identified patent and that said Letters Patent is hereby corrected as shown below:

In the Claims

Column 10, Claim 5, Line 34, please correct "mobile terminal" to read: --mobile terminal information--.

Column 10, Claim 9, Line 67, please correct "first mobile terminal;" to read: --mobile terminal;--.

Column 11, Claim 9, Line 5, please correct "first mobile terminal" to read: --mobile terminal--.

Column 11, Claim 12, Line 28, please correct "terminal" to read: --terminal information--.

Column 12, Claim 18, Line 39, please correct "stores" to read: --stores information about--.

Signed and Sealed this
Third Day of December, 2019

Andrei Iancu
*Director of the United States Patent and Trademark Office*